United States Patent
Pontes et al.

(10) Patent No.: US 9,145,322 B2
(45) Date of Patent: Sep. 29, 2015

(54) BI-AXIAL COOLING SYSTEM AND METHOD

(71) Applicants: Pedro Pontes, Obfelden (CH); Stefano Vecchi, Lucerne (CH)

(72) Inventors: Pedro Pontes, Obfelden (CH); Stefano Vecchi, Lucerne (CH)

(73) Assignee: Emhart Glass S.A., Cham (CH)

( * ) Notice: Subject to any disclaimer, the term of this patent is extended or adjusted under 35 U.S.C. 154(b) by 282 days.

(21) Appl. No.: 13/723,812

(22) Filed: Dec. 21, 2012

(65) Prior Publication Data

US 2014/0109619 A1    Apr. 24, 2014

Related U.S. Application Data (60) Provisional application No. 61/716,340, filed on Oct. 19, 2012.

(51) Int. Cl.
*C03B 9/38* (2006.01)

(52) U.S. Cl.
CPC ............. *C03B 9/3891* (2013.01); *C03B 9/3866* (2013.01); *C03B 9/3875* (2013.01); *C03B 9/3883* (2013.01)

(58) Field of Classification Search
CPC ...... C03B 9/3883; C03B 9/38; C03B 9/3875; C03B 9/3891
See application file for complete search history.

(56) References Cited

U.S. PATENT DOCUMENTS

| | | | |
|---|---|---|---|
| 3,617,232 A | 11/1971 | Goodwin | |
| 4,251,253 A | 2/1981 | Becker et al. | |
| 4,561,875 A | 12/1985 | Foster | |
| 4,578,104 A | 3/1986 | Jones | |
| 4,579,576 A | 4/1986 | Jones | |
| 4,657,573 A * | 4/1987 | Jones | 65/265 |
| 4,690,703 A * | 9/1987 | Kulig | 65/265 |
| 4,701,202 A * | 10/1987 | Foster | 65/265 |
| 4,783,212 A * | 11/1988 | Loffler | 65/265 |
| 5,304,229 A * | 4/1994 | Swanfeld | 65/265 |
| 5,330,551 A * | 7/1994 | Bolin | 65/265 |
| 5,364,437 A * | 11/1994 | Bolin | 65/265 |
| 6,109,063 A | 8/2000 | Ciricello et al. | |
| 6,182,473 B1 | 2/2001 | Gottlieb | |
| 7,134,301 B2 | 11/2006 | Meyer et al. | |
| 8,127,573 B2 | 3/2012 | Meyer et al. | |
| 2003/0167799 A1* | 9/2003 | Tijerina-Ramos et al. | 65/68 |
| 2007/0227192 A1* | 10/2007 | Meyer et al. | 65/356 |
| 2011/0259054 A1* | 10/2011 | Newsom et al. | 65/348 |
| 2012/0186301 A1* | 7/2012 | Nishimura et al. | 65/162 |

FOREIGN PATENT DOCUMENTS

| | | |
|---|---|---|
| EP | 0242197 | 10/1987 |
| EP | 0184394 | 5/1989 |

* cited by examiner

*Primary Examiner* — Jason L Lazorcik (74) *Attorney, Agent, or Firm* — Reinhart Boerner Van Deuren P.C.

(57) ABSTRACT

An improved system and method is disclosed for providing cooling air to mating mold halves during the entire cycle and an additional degree of cooling during the portion of the cycle when hot glass material is enclosed within mating mold halves. Countercurrent cooling air flows are established in separate arrays of cooling passages located in each mold half, with one of the cooling air flows being capable of actively cooling the mold halves over the full cycle rather than only when the mold halves are in their closed position. The cooling air flowing in the separate arrays of cooling passages allows separate timing and control of the cooling air flows supplied to the arrays of cooling passages in the molds.

20 Claims, 7 Drawing Sheets

BI-AXIAL COOLING SYSTEM AND METHOD

IDENTIFICATION OF RELATED PATENT APPLICATION

This patent application claims priority of both U.S. Provisional Patent Application No. 61/716,340, which is entitled "Bi-Axial Cooling System and Method," and which was filed on Oct. 19, 2012, which patent application is hereby incorporated herein by reference in its entirety.

BACKGROUND OF THE INVENTION

Field of the Invention

The present invention relates generally to the cooling of molds used to form glass containers, and more particularly to an improved system and method for providing cooling air to mating mold halves during the entire cycle and an additional degree of cooling during the portion of the cycle when hot glass material is enclosed within mating mold halves.

The problem of cooling the molds in I.S. machines has been exacerbated by the increased operational speed of I.S. machines, with the problem of draining heat away from the molds becoming progressively more difficult with this increase in the operating speed of I.S. machines. As may be expected, there have been several approaches taken to deal with this problem. Early cooling systems used outwardly-extending fins located on the outer surfaces of the mold halves. A number of other approaches use a cooling flow through a plurality of cooling bores that are drilled into the side walls of mold halves. Such cooling flows are most frequently cooling air flows; although liquid cooling has been used, liquid cooling presents an additional set of issues that increase the mechanical complexity of the cooling flow system design.

A wide variety of mechanical designs have been proposed to provide cooling air flow to a plurality of vertically oriented cooling bores in the mold halves. Initially, cooling air flow was supplied on the blow side from a plenum chamber located under the bottom plate, with apertures located in the plenum chamber and the bottom plate leading to vertical cooling passages in the mold halves, with the cooling air flowing upwardly through the vertical cooling passages in the mold halves. An example of such a system is found in U.S. Pat. No. 4,690,703, to Kulig, which patent is assigned to the assignee of the present patent application. Another example of a cooling arrangement flowing air upwardly through the vertical cooling passages in the mold halves on the blow side is found in U.S. Pat. No. 7,134,301, to Meyer et al., which patent is assigned to the assignee of the present patent application, and which discloses an arrangement having a plenum chamber located in a lower hanger assembly for each mold half which provides cooling air to cooling passages in the mold halves at entrances to the cooling passages located at the bottoms of the mold halves to cool the mold halves.

Another example of such a cooling arrangement on the blow side is found in U.S. Pat. No. 4,561,875, to Foster, which patent is assigned to the assignee of the present patent application, and which discloses an arrangement having a plenum chamber extending above each mold half and supplying cooling air to cooling passages in the mold halves at entrances to the cooling passages located at the tops of the mold halves to cool the side portions of the mold halves. Still another example of such a cooling arrangement on the blow side is found in U.S. Pat. No. 8,127,573, to Meyer et al., which patent is assigned to the assignee of the present patent application, and which discloses an arrangement supplying cooling air from cooling chambers to vertical cooling passages respectively located in each mold half midway along the length of the cooling passages (or alternately at an end of the cooling passages). The arrangement of this reference that supplies cooling air to the cooling passages midway along their lengths is believed to represent the only arrangement having cooling air flowing both upwardly and downwardly in the mold halves, although such air flows are each only in part of the mold halves.

An improved cooling arrangement that was developed by the assignee of the present patent application is the VERTI-FLOW® mold cooling system (VERTI-FLOW® is a registered trademark of the assignee of the present patent application) that supplies cooling air from a plenum chamber located below the mold plate to vertical cooling passages respectively located in each mold half. The VERTI-FLOW® mold cooling system, which is equally applicable on the blank side and the blow side, and which can be applied only when the mold halves are in their closed position, provides a greater degree of uniformity in mold surface temperatures, virtually eliminating hot spots on blank molds. The VERTI-FLOW® mold cooling system on the blow side can use multiple arcuate arrays of vertical cooling passages located in the plenum chamber, the mold plate, and the mold halves.

While the VERTI-FLOW® mold cooling system offers many advantages, it does flow all of the cooling air flow in only a single direction within the molds. This inhibits uniformity of the vertical temperature profile within the mold halves. Additionally, the VERTI-FLOW® mold cooling system only flows cooling air through the molds when the mold halves are located in their closed position. Similarly, all of the other cooling systems referenced above also present similar non-uniform vertical temperature profiles and other drawbacks.

It will thus be appreciated that it would be desirable to provide improved cooling of molds over the full cycle to extend the active cooling time to the full I.S. machine cycle (360°) rather than only when the mold halves are in their closed position. It would also be desirable to be able to better control the vertical temperature profiles in the mold halves to make the vertical temperature profiles more uniform. It would also be desirable that all of the aforesaid advantages be achieved without incurring any substantial relative disadvantage.

The subject matter discussed in this background of the invention section should not be assumed to be prior art merely as a result of its mention in the background of the invention section. Similarly, a problem mentioned in the background of the invention section or associated with the subject matter of the background of the invention section should not be assumed to have been previously recognized in the prior art. The subject matter in the background of the invention section merely represents different approaches, which in and of themselves may also be inventions.

SUMMARY OF THE INVENTION

The disadvantages and limitations of the background art discussed above are addressed by the present invention. With this invention, each mold half is provided with two separate arrays of vertical cooling passages, which may be an inner array of vertical cooling passages (which may optionally be in an arcuate or semi-circular array) and an outer array of vertical cooling passages (which may optionally be in an arcuate or semi-circular array) located in each mold half. One of these arrays of vertical cooling passages (a first array of vertical cooling passages, preferably the inner array of vertical cooling passages) in each of the mold halves will be supplied with cooling air from a lower plenum chamber located below a mold plate when the mold halves are in their closed position. The other of these arrays of vertical cooling passages (a second array of vertical cooling passages, preferably the outer array of vertical cooling passages) in each of the mold halves will be supplied with cooling air from an upper plenum chamber that travels with a mold half support assembly (that can support all of the mold halves on one side in a section) regardless of whether the mold halves are open, closed, or moving in either direction at a location between fully open and closed.

The cooling air in the array of vertical cooling passages supplied from the lower plenum chamber travels upwardly in the first arrays of vertical cooling passages, while the cooling air in the array of vertical cooling passages supplied from the upper plenum chambers travels upwardly in the second arrays of vertical cooling passages. These "countercurrent air flows" allow for substantially improved accuracy in the degree of control that may be exerted on vertical temperature profiling. Further, the first arrays of vertical cooling passages and the second arrays of vertical cooling passages can be separately controlled, and the supply of cooling air flow to the first arrays of vertical cooling passages and the second arrays of vertical cooling passages can be separately timed.

In a first exemplary implementation of the present invention, an improved system for providing cooling air to molds for molding hot glass material into glass containers comprises: a first manifold configured to connect to a first source of cooling air, a first plurality of apertures located in a distributor plate on a top side of the first manifold and extending between the first manifold and a top side of the distributor plate; a bottom plate assembly; a pair of mold halves moveable between an open position in which the mold halves are spaced away from each other and a closed position in which the mold halves engage a portion of the bottom plate assembly and each other to form a mold; a pair of mold half support assemblies for respectively supporting the pair of mold halves and for selectively moving the mold halves between their open and closed positions; a first plurality of vertical cooling passages located in and extending through the pair of mold halves, the first plurality of vertical cooling passages in the pair of mold halves being in fluid communication at bottom ends thereof with the plurality of apertures located in the distributor plate to receive cooling air from the first manifold when the mold halves are in their closed position; a second plurality of vertical cooling passages located in the pair of mold halves separate from the first plurality of vertical cooling passages located in the pair of mold halves, each of the second plurality of vertical cooling passages having an inlet and an outlet; and an additional manifold associated with each of the pair of mold half support assemblies, the additional manifolds being configured to connect to a second source of cooling air, the second plurality of vertical cooling passages in the pair of mold halves being in fluid communication at their respective inlets with at least one opening located in each of the additional manifolds to continuously receive cooling air therefrom irrespective of the position of the mold halves.

In a second exemplary implementation of the present invention, an improved system for providing cooling air to molds for molding hot glass material into glass containers comprises: a first manifold located in configured to connect to a first source of cooling air, a first plurality of apertures located in a distributor plate on the top side of the first manifold and extending between the first manifold and a top side of the distributor plate; a bottom plate assembly having a plurality of apertures extending therethrough; a pair of mold halves moveable between an open position in which the mold halves are spaced away from each other and a closed position in which the mold halves engage a portion of the bottom plate assembly and each other to form a mold; a pair of mold half support assemblies for respectively supporting the pair of mold halves and for selectively moving the mold halves between their open and closed positions; a first plurality of vertical cooling passages located in and extending through the pair of mold halves which form an annular array characterized by a first diameter when the mold halves are in their closed position, the first plurality of vertical cooling passages in the pair of mold halves being in fluid communication at bottom ends thereof with the plurality of apertures in the bottom plate assembly and the plurality of apertures located in the distributor plate to receive cooling air from the first manifold when the mold halves are in their closed position, the cooling air flowing in a first direction in the first plurality of vertical cooling passages; a second plurality of vertical cooling passages located in the pair of mold halves which form an annular array characterized by a second diameter larger than the first diameter when the mold halves are in their closed position, the second plurality of vertical cooling passages in the pair of mold halves being separate from the first plurality of vertical cooling passages located in the pair of mold halves, each of the second plurality of vertical cooling passages having an inlet and an outlet; and an additional manifold associated with each of the pair of mold half support assemblies, the additional manifolds being configured to connect to a second source of cooling air, the second plurality of vertical cooling passages in the pair of mold halves being in fluid communication at their respective inlets with at least one opening located in each of the additional manifolds to continuously receive cooling air therefrom irrespective of the position of the mold halves, the cooling air flowing in a second direction opposite to the first direction in the second plurality of vertical cooling passages.

In a third exemplary implementation of the present invention, an improved system for providing cooling air to molds for molding hot glass material into glass containers comprises: a first manifold having a distributor plate on a top side thereof in the bottom plate assembly for supplying cooling air from a first plurality of apertures extending between the first manifold and a top side of a distributor plate located on the top side of the first manifold; a bottom plate assembly; a pair of mold halves moveable between a spaced-apart open position and a closed position in which the mold halves and the bottom plate assembly form a mold; a pair of mold half support assemblies for respectively supporting the pair of mold halves and selectively moving the mold halves between their open and closed positions; a first plurality of vertical cooling passages located in the pair of mold halves that are in fluid communication at bottom ends thereof with the plurality of apertures in the bottom plate assembly to receive cooling air from the first manifold when the mold halves are in their closed position; a second plurality of vertical cooling passages located in the pair of mold halves each having an inlet and an outlet; and an additional manifold associated with each of the pair of mold half support assemblies for continuously supplying cooling air from at least one opening in each of the additional manifolds to the inlet of the second plurality of vertical cooling passages in the pair of mold halves irrespective of the position of the mold halves.

In a method for providing cooling air to mating mold halves for molding hot glass material into glass containers: respectively supporting a pair of mold halves with a pair of mold half support assemblies which selectively move the mold halves between an open position in which the mold halves are spaced away from each other and a closed position in which the mold halves engage a portion of a bottom plate assembly and each other to form a mold; providing a first plurality of vertical cooling passages in each of the mold halves; providing a second plurality of vertical cooling passages in each of the mold halves separate from the first plurality of vertical cooling passages located in the pair of mold halves; supplying cooling air from a first manifold having a distributor plate on a top side thereof through a first plurality of apertures located in the distributor plate to the first plurality of vertical cooling passages in the pair of mold halves at bottom ends thereof when the mold halves are in their closed position; and continuously supplying cooling air from an additional manifold associated with each of the pair of mold half support assemblies through at least one opening located in each of the additional manifolds to the second plurality of vertical cooling passages in the pair of mold halves at their respective inlets irrespective of the position of the mold halves.

It may therefore be seen that the bi-axial cooling system and method of the present invention provides improved cooling of molds over the full I.S. machine cycle (360°) to thereby extend the active cooling time to the full cycle rather than only when the mold halves are in their closed position. The use by the bi-axial cooling system and method of the countercurrent flow embodiment facilitates better control of the vertical temperature profiles in the mold halves to make the vertical temperature profiles more uniform. Separately timing and controlling the cooling air flow supplied to the first and first arrays of vertical cooling passages enables further optimization of the cooling of the molds. These advantages are achieved without incurring any substantial relative disadvantage.

DESCRIPTION OF THE DRAWINGS

These and other advantages of the present invention are best understood with reference to the drawings, in which.

DETAILED DESCRIPTION OF THE EXEMPLARY EMBODIMENT

An exemplary embodiment of the bi-axial cooling system and method of the present invention will be shown and its operation discussed herein. It will be understood that while with reference to some drawings only one blow mold and the components of only the blow side of one section of an I.S. machine may be shown, the teachings of the bi-axial cooling system and method of the present invention are equally applicable to all of the molds (both blank molds and blow molds) and all of the sections of I.S. machines. The description in FIGS. 1 and 2 that follow will focus upon a single blow mold, and the description in FIGS. 3 through 7 that later follow will focus upon the blow side of a single section of an I.S. machine, but it will be understood that these teachings are fully applicable to the entire I.S. machine.

Figure 1:
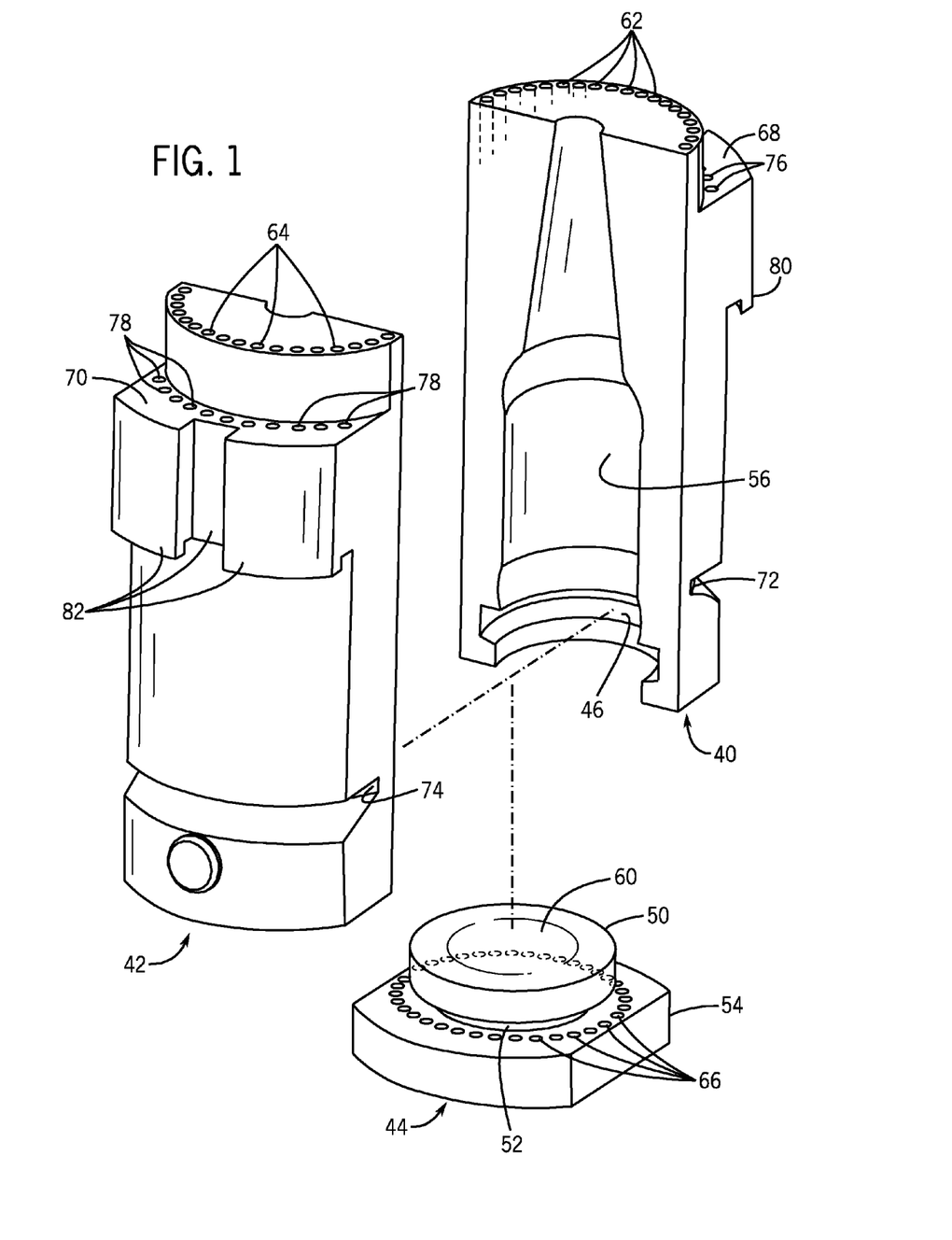
FIG. 1 is an exploded, isometric view of the two halves of a blow mold and the bottom plate that they interface with, showing the inner and outer cooling bore arrays in the mold halves and the aligning inner cooling bore arrays in the bottom plate.
Figure 2:
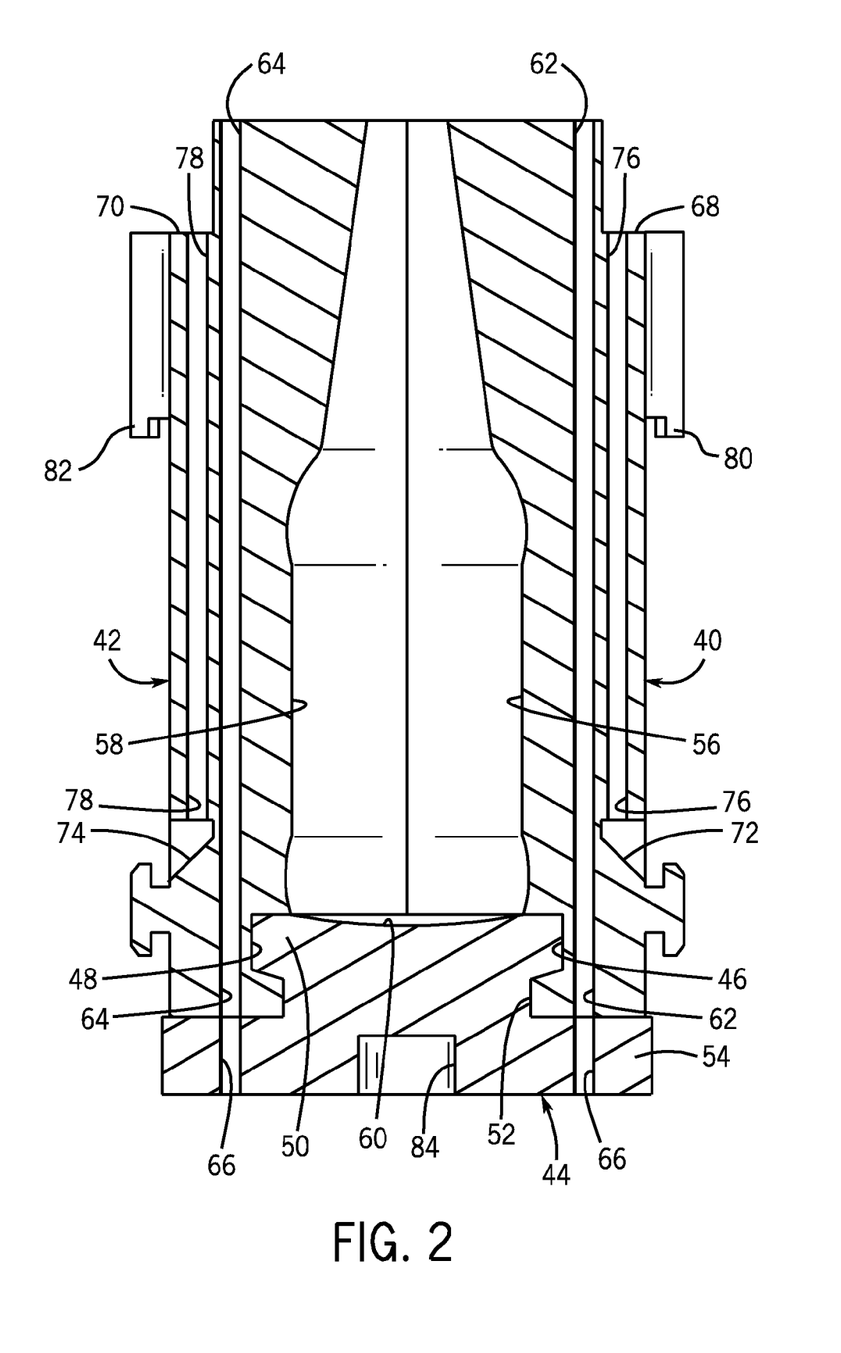
FIG. 2 is a cross-sectional side view of the mold halves and the bottom plate shown in FIG. 1 in their engaged positions with respect to each other, showing an inner cooling bore and an outer cooling bore in each of the mold halves and an aligned inner cooling bore in the bottom plate.

Referring first to FIGS. 1 and 2, a pair of mating mold halves 40 and 42 and a bottom plate 44 are shown. Located inside the mold halves 40 and 42 just above the bottoms thereof are semi-annular recesses 46 and 48, respectively. The bottom plate 44 has a larger diameter portion 50 mounted atop a smaller diameter intermediate portion 52, which is itself mounted on top of a base portion 54.

When the mold halves 40 and 42 are in their closed position engaging each other and the bottom plate 44 as shown in FIG. 2, the larger diameter portion 50 of the bottom plate 44 is engaged in the semi-annular recess 46 of the mold half 40 and the semi-annular recess 48 of the mold half 42. Also, when the mold halves 40 and 42 are in their closed position as shown in FIG. 2, the interior surfaces 56 and 58 of the mold halves 40 and 42, respectively, and an interior surface 60 of the bottom plate 44 together define a molding surface that defines the outer contours of a glass container (not shown in FIGS. 1 and 2) that is blown from a parison (not shown in FIGS. 1 and 2) (except for the finish of the glass container, which would be located above the top of the mold halves 40 and 42).

The mold halves 40 and 42 have first arrays of vertical cooling passages 62 and 64, respectively, extending entirely therethrough from the bottom of the mold halves 40 and 42 to the top of the mold halves 40 and 42. The base portion 54 of the bottom plate 44 has an array of vertically-oriented apertures 66 extending entirely therethrough which are respectively aligned with the first arrays of vertical cooling passages 62 and 64 when the mold halves 40 and 42 are in their closed position engaging each other and the bottom plate 44 as shown in FIG. 2. There may be fewer or more than the seventeen vertical cooling passages 62 and 64 illustrated in FIG. 1, e.g. from eight to thirty vertical cooling passages 62 and 64.

The arrays of array of vertical cooling passages 62 and 64 may be seen to be in a circular or an approximately circular array in FIG. 1, although they could be of a different configuration (e.g., arcuate) if desired. In use, a cooling air supply will be provided from the bottom of the bottom plate 44 through the array of vertically-oriented apertures 66, and upwardly through the first arrays of vertical cooling passages 62 and 64 in the mold halves 40 and 42, respectively, as will become evident below in conjunction with the discussion of FIG. 7.

Located somewhat below the top of the mold halves 40 and 42 (approximately one-eighths of the way down from the tops of the mold halves 40 and 42) are outwardly-extending ledges 68 and 70, respectively. Located somewhat above the bottom of the mold halves 40 and 42 (approximately one-fifth of the way up from the bottoms of the mold halves 40 and 42) are inwardly-extending grooves 72 and 74, respectively. The inwardly-extending grooves 72 and 74 have a flat surface on their respective top sides and an angular surface on their respective bottom sides, with the inwardly-extending grooves 72 and 74 becoming wider toward the outsides of the mold halves 40 and 42.

The mold halves 40 and 42 have second arrays of vertical cooling passages 76 and 78, respectively, extending entirely therethrough from the outwardly-extending ledges 68 and 70, respectively, of the mold halves 40 and 42 to the inwardly-extending grooves 72 and 74, respectively, in the mold halves 40 and 42. There may be fewer or more than the eleven vertical cooling passages 76 and 78 illustrated in FIG. 1, e.g. from five to twenty vertical cooling passages 76 and 78.

The arrays of array of vertical cooling passages 76 and 78 may be seen to be in arcuate arrays in FIG. 1, although they could be of a different configuration if desired. In use, a cooling air supply will be provided from the top of the outwardly-extending ledges 68 and 70 through the second arrays of vertical cooling passages 76 and 78 in the mold halves 40 and 42, respectively, as will become evident below in conjunction with the discussion of FIG. 7.

Completing the construction of the mold half is mounting paraphernalia indicated generally by the reference numeral 80 located on the outside of the mold half 40 below the outwardly-extending ledge 68 in the mold half 40. Similarly, completing the construction of the mold half 42 is mounting paraphernalia indicated generally by the reference numeral 82 located on the outside of the mold half 42 below the outwardly-extending ledge 68 in the mold half 42. Finally, centrally located in the bottom of the base portion 54 of the bottom plate 44 is a cylindrical recess 84, which will be used in mounting the bottom plate 44, as will become evident below in conjunction with the discussion of FIG. 7.

Figure 3:
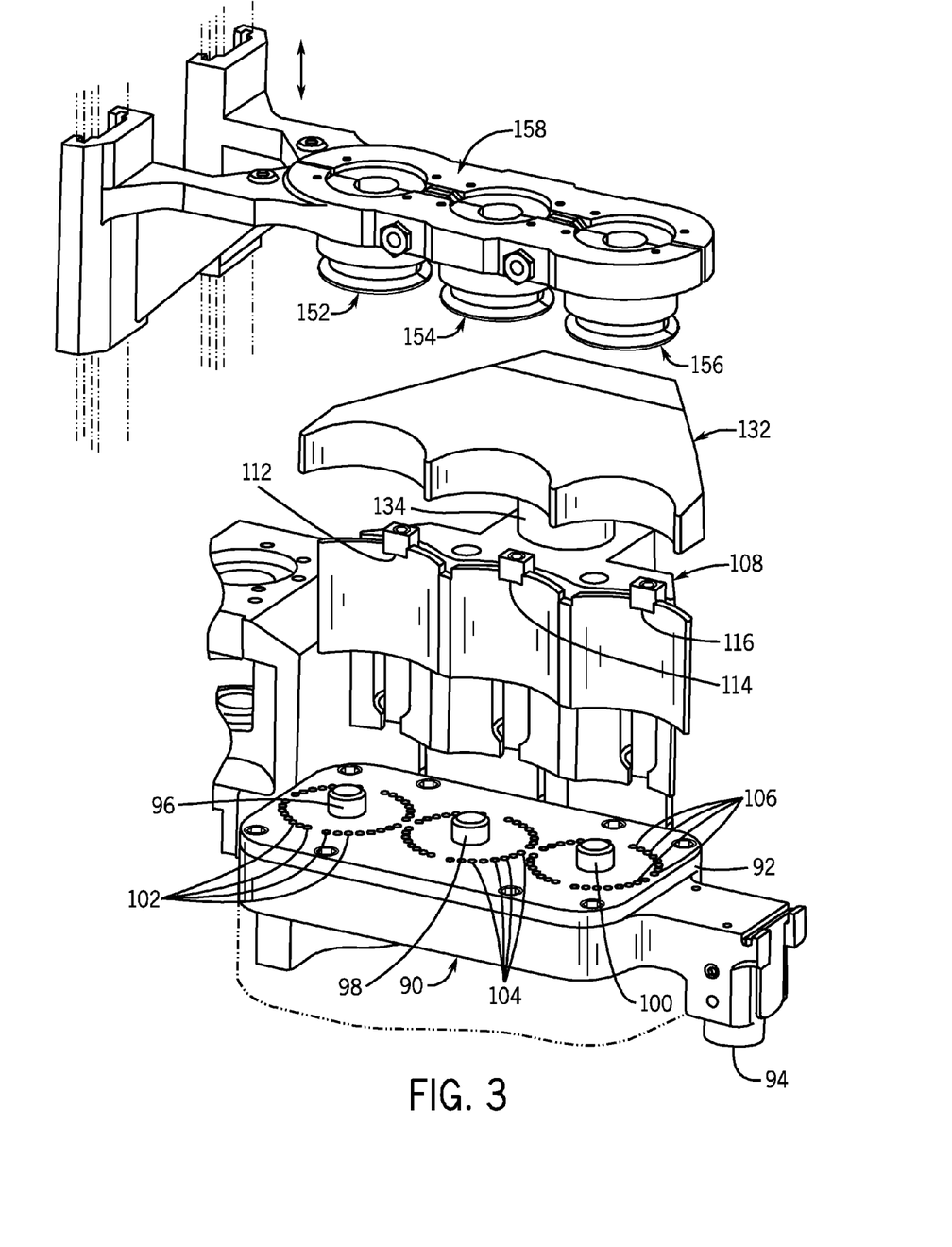
FIG. 3 is an isometric view of portions of an I.S. machine with non-relevant portions not shown to enhance clarity, showing a lower plenum chamber upon which the bottom plates of three blow molds will rest, a first mold half support assembly for supporting three mold halves, a first upper plenum chamber supported by the mold half support assembly, and three blow heads and portions of a blow head support assembly.
Figure 4:
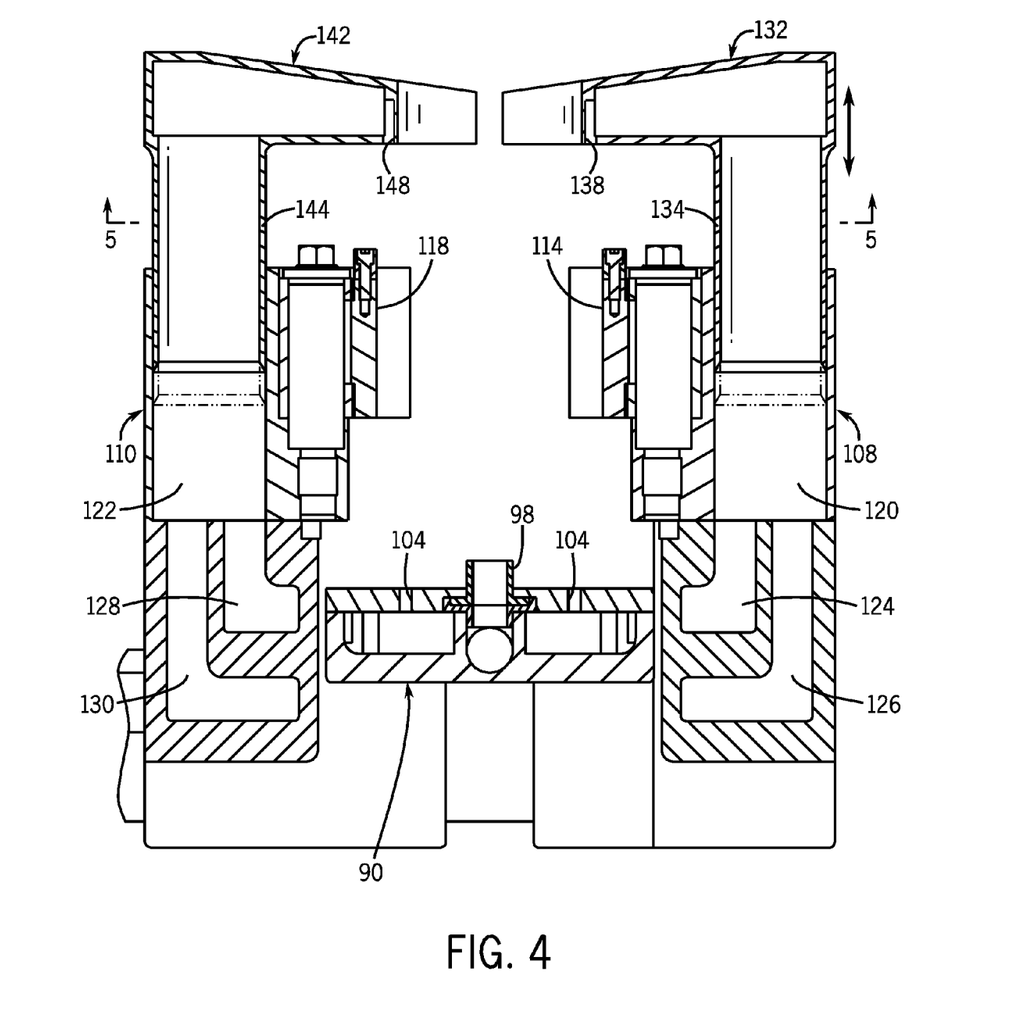
FIG. 4 is a cross-sectional end view of the apparatus shown in FIG. 3, additionally showing a second mold half support assembly for supporting three mating mold halves and a second upper plenum chamber supported by the second mold half support assembly.
Figure 5:
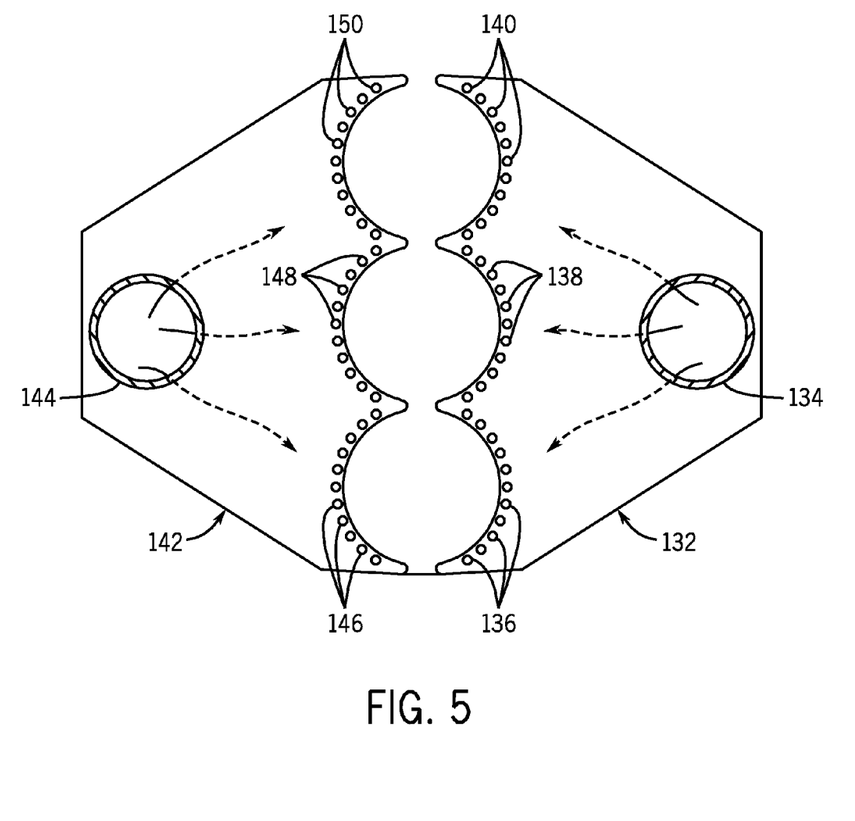
FIG. 5 is a cross-sectional horizontal view showing the undersides of the first and second upper plenum chambers.

Referring next to FIGS. 3 through 5, portions of a section of an I.S. machine relevant to the interactive expert system and method of the present invention are illustrated, with other portions of the section of an I.S. machine removed for clarity in FIG. 3. A lower plenum chamber 90 is shown at the bottom of FIG. 3 and has a flat distributor plate 92 located on its top side. The lower plenum chamber 90 has an air inlet 94 that supplies pressurized cooling air to the lower plenum chamber 90.

The distributor plate 92 accommodates the installation of three bottom plates 44 (not shown in FIGS. 3 through 5) respectively onto three cylindrical locating spacers 96, 98, and 100 that extend upwardly from the top side of the distributor plate 92. Located around the three locating spacers 96, 98, and 100 are three arrays of cooling apertures 102, 104, and 106, respectively, through which pressurized cooling air from the lower plenum chamber 90 is supplied. Although the mold half 40, the mold half 42, and the bottom plate 44 (which mold will be installed on each of the locating spacers 96, 98, and 100) are not shown in FIGS. 3 through 5, it may be appreciated that each of the arrays of cooling apertures 102, 104, and 106 will supply cooling air through the array of vertically-oriented apertures 66 in the bottom plate 44 (not shown in FIGS. 3 through 5) and then to the bottoms of the first array of vertical cooling passages 62 in the mold half 40 (not shown in FIGS. 3 through 5) and the first array of vertical cooling passages 64 in the mold half 42 (not shown in FIGS. 3 through 5).

Located above the lower plenum chamber 90 are two mold half support assemblies 108 and 110 (only the mold half support assembly 108 is shown in FIG. 3. The mold half support assembly 108 has three sets of mold mounting paraphernalia indicated generally by the reference numeral 112, 114, and 116, respectively, mounted thereupon. Similarly, the mold half support assembly 110 has three sets of mold mounting paraphernalia mounted thereupon, although only one set of the mold mounting paraphernalia 118 is shown herein (in FIG. 4).

Three of the mold halves 40 will be mounted on the three sets of mold mounting paraphernalia 112, 114, and 116 on the mold half support assembly 108, and three of the mold halves 42 will be mounted on the three sets of mold mounting paraphernalia (the center one of which is the mold mounting paraphernalia 118) on the mold half support assembly 110. It will be appreciated by those skilled in the art that the mold half support assemblies 108 and 110 are operated by a mold open-and-close apparatus (not shown herein) that may be of conventional design which opens and closes the three sets of mold halves 40 and 42.

As shown in FIG. 4, respectively located on the back sides of the mold half support assemblies 108 and 110 in the center portions thereof are plenums 120 and 122, respectively, each of which has an opening on the top side thereof. The plenum 120 is supplied with pressurized air through passageways 124 and 126 in the mold half support assembly 108, and the plenum 122 is supplied with pressurized air through passageways 128 and 130 in the mold half support assembly 110.

Figure 6:
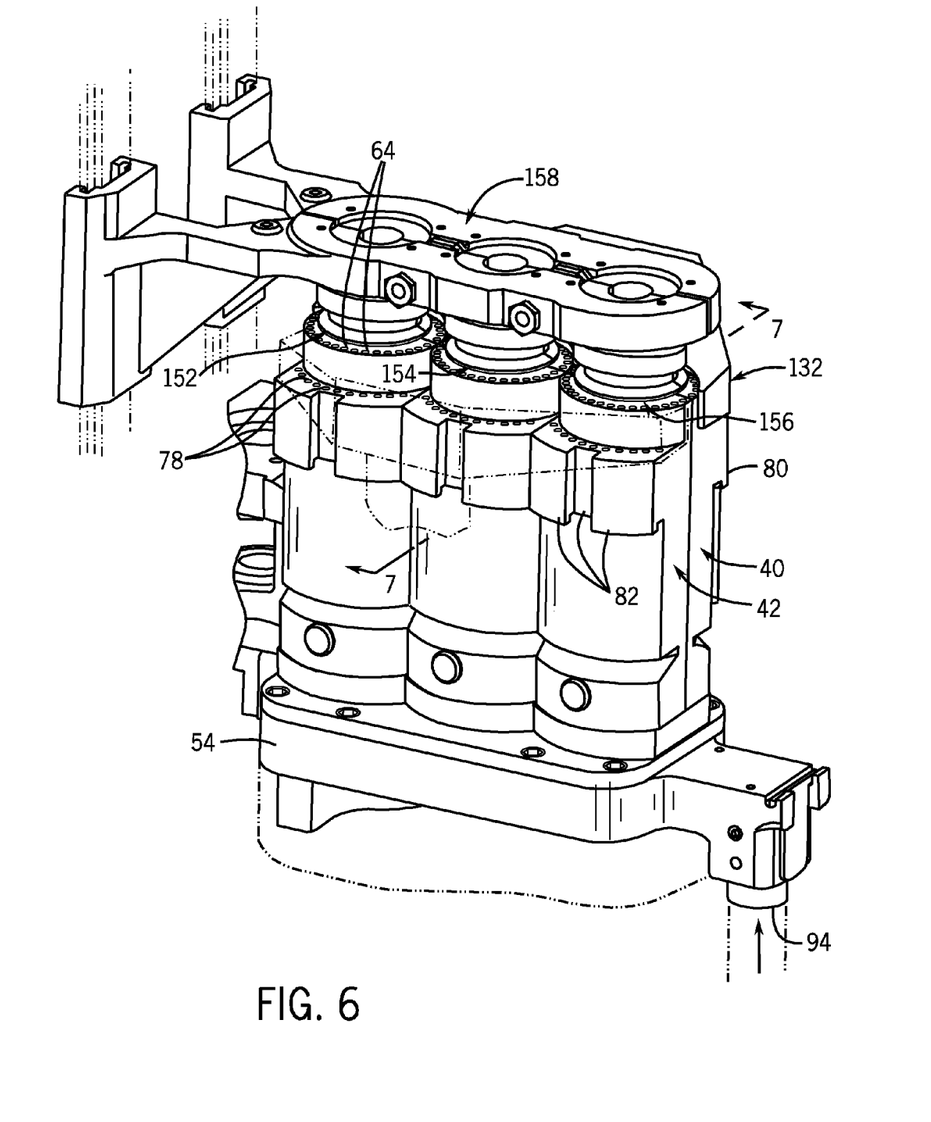
FIG. 6 is an isometric view of the apparatus shown in FIG. 3 with three blow molds installed on the lower plenum chamber, the three blow heads lowered onto the three blow molds, the first mold half support assembly supporting three mold halves, and the first upper plenum chamber in engagement with the three mold halves, with the second mold half support assembly and the second upper plenum chamber removed for clarity.

Referring now to FIGS. 4 and 5, a first upper plenum chamber 132 has an inlet portion 134 that is slidably mounted in the plenum 120 of the mold half support assembly 108 to receive pressurized air from the plenum 120. The first upper plenum chamber 132 has three arrays of outlet apertures 136, 138, and 140 located on an underside thereof (as shown in FIG. 5) that will supply cooling air to the second arrays of vertical cooling passages 76 in three mold halves 40 (shown in FIG. 2) that are respectively installed adjacent three bottom plates 44 that are respectively located on the three locating spacers 96, 98, and 100. The arrays of outlet apertures 136, 138, and 140 may be as shown in FIG. 6, or alternately they each may be one or more slots. The three mold halves 40 are respectively mounted on the three sets of mold mounting paraphernalia 112, 114, and 116 of the mold half support assembly 108.

Similarly, a second upper plenum chamber 142 has an inlet portion 144 that is slidably mounted in the plenum 122 of the mold half support assembly 110 to receive pressurized air from the plenum 122. The second upper plenum chamber 142 has three arrays of outlet apertures 146, 148, and 150 located on an underside thereof (as shown in FIG. 5) that will supply cooling air to the second arrays of vertical cooling passages 76 in three mold halves 42 (shown in FIG. 2) that will be respectively installed adjacent three bottom plates 44 that will be respectively located on the three locating spacers 96, 98, and 100. The arrays of outlet apertures 146, 148, and 150 may be as shown in FIG. 6, or alternately they each may be one or more slots. The three mold halves 42 are respectively mounted on the three sets of mold mounting paraphernalia (only the middle set of the mold mounting paraphernalia 118 is shown) of the mold half support assembly 108.

Referring again to FIG. 3, although they may be of conventional design, also shown at the top of FIG. 3 are three blow heads 152, 154, and 156 that are respectively supported above the positions of mold halves 40 and 42 that will be respectively installed adjacent three bottom plates 44 that will be respectively located on the three locating spacers 96, 98, and 100. The three blow heads 152, 154, and 156 are supported for vertical movement by a blow head support assembly 158. Other portions of the section are not displayed herein since they are not included in the relevant components of the bi-axial cooling system and method of the present invention.

Referring briefly to FIG. 6, the three molds each consisting of the mold half 40, the mold half 42, and the bottom plate 44 are shown with the mold halves 40 and 42 in their closed position. The mold half support assembly 110 is not shown in FIG. 6 to enhance clarity. The three blow heads 152, 154, and 156 and the blow head support assembly 158 are shown in their lowered position, with the three blow heads 152, 154, and 156 being located on the three molds.

Figure 7:
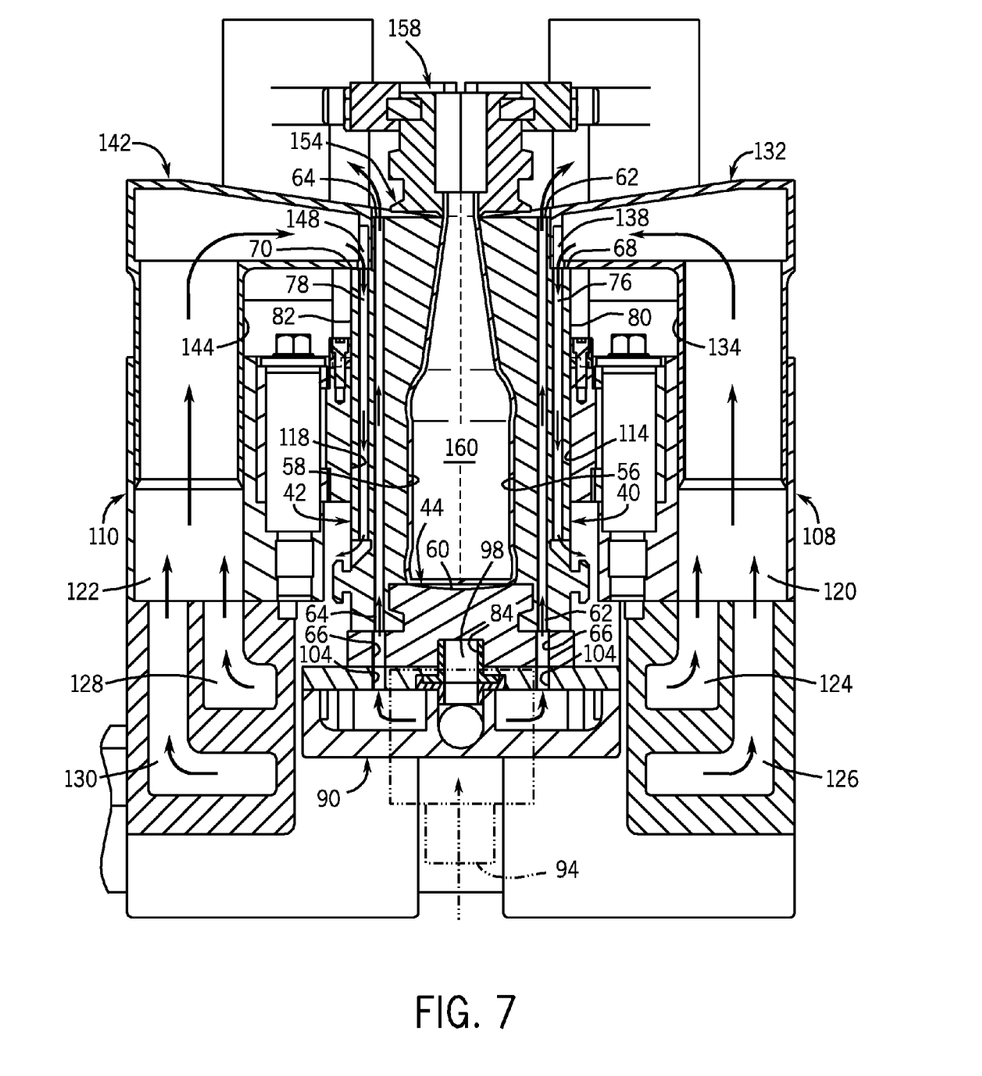
FIG. 7 is a cross-sectional side view of the apparatus shown in FIG. 6, with the second mold half support assembly and the second upper plenum chamber being shown as well.

Referring finally to FIG. 7, the entire bi-axial cooling system and method of the present invention is shown in cross-section to facilitate a description of its operation. In FIG. 7, it may be seen that the mold halves 40 and 42 are respectively mounted on the mold half support assemblies 108 and 110, and that the mold half support assemblies 108 and 110 are in their closed position engaging the bottom plate 44, with the blow head 154 lowered by the blow head support assembly 158 onto the tops of the mold halves 40 and 42. A blown glass container 160 is shown within the mold surrounded by the interior surface 56 of the mold half 40, the interior surface 58 of the mold half 40, and the interior surface 60 of the bottom plate 44.

It may be seen that cooling air exits the lower plenum chamber 90 from the array of cooling apertures 104, flows through the array of vertically-oriented apertures 66 in the bottom plate 44, and then flows upwardly through the first array of vertical cooling passages 62 in the mold half 40 and the first array of vertical cooling passages 64 in the mold half 42. This flow of cooling air cools the mold halves 40 and 42 whenever they are in their closed position.

It may also be seen that cooling air entering the plenum 120 from the passageways 124 and 126 flows into the first upper plenum chamber 132 and out therefrom through the array of outlet apertures 138 downwardly through the second array of vertical cooling passages 76 in the mold half 40, leaving the second array of vertical cooling passages 76 through the inwardly-extending groove 72. Similarly, cooling air entering the plenum 122 from the passageways 128 and 130 flows into the second upper plenum chamber 142 and out therefrom through the array of outlet apertures 148 downwardly through the second array of vertical cooling passages 78 in the mold half 42, leaving the second array of vertical cooling passages 78 through the inwardly-extending groove 74. This flow of cooling air is capable of cooling the mold halves 40 and 42 irrespective of what position they are in, whether their closed position as shown in FIG. 7, or in their open position, or anywhere therebetween.

It may thus be appreciated that the cooling airflow supplied to the molds by the interactive expert system and method of the present invention has countercurrent air flows, in that cooling air moves upwardly through the first array of vertical cooling passages 62 in the mold half 40 and the first array of vertical cooling passages 64 in the mold half 42, and downwardly through the second array of vertical cooling passages 76 in the mold half 40 and the second array of vertical cooling passages 78 in the mold half 42. Since the upwardly flowing cooling air can be controlled completely independently of the downwardly flowing cooling air, and timed in any manner desired, these independently controlled countercurrent air flows allow for substantially improved accuracy in the degree of control that may be exerted on vertical temperature profiling.

It may therefore be appreciated from the above detailed description of the preferred embodiment of the present invention that it provides improved cooling of molds over the full I.S. machine cycle (360°) to thereby extend the active cooling time to the full cycle rather than only when the mold halves are in their closed position. The use by the bi-axial cooling system and method of the countercurrent flow embodiment facilitates better control of the vertical temperature profiles in the mold halves to make the vertical temperature profiles more uniform. Separately timing and controlling the cooling air flow supplied to the first and first arrays of vertical cooling passages enables further optimization of the cooling of the molds. These advantages are achieved without incurring any substantial relative disadvantage.

Although the foregoing description of the present invention has been shown and described with reference to particular embodiments and applications thereof, it has been presented for purposes of illustration and description and is not intended to be exhaustive or to limit the invention to the particular embodiments and applications disclosed. It will be apparent to those having ordinary skill in the art that a number of changes, modifications, variations, or alterations to the invention as described herein may be made, none of which depart from the spirit or scope of the present invention. The particular embodiments and applications were chosen and described to provide the best illustration of the principles of the invention and its practical application to thereby enable one of ordinary skill in the art to utilize the invention in various embodiments and with various modifications as are suited to the particular use contemplated. All such changes, modifications, variations, and alterations should therefore be seen as being within the scope of the present invention as determined by the appended claims when interpreted in accordance with the breadth to which they are fairly, legally, and equitably entitled.

While the current application recites particular combinations of features in the claims appended hereto, various embodiments of the invention relate to any combination of any of the features described herein whether or not such combination is currently claimed, and any such combination of features may be claimed in this or future applications. Any of the features, elements, or components of any of the exemplary embodiments discussed above may be claimed alone or in combination with any of the features, elements, or components of any of the other embodiments discussed above.

What is claimed is:

1. An improved system for providing cooling air to molds for molding hot glass material into glass containers, comprising:
    a first manifold configured to connect to a first source of cooling air, a first plurality of apertures located in a distributor plate on a top side of the first manifold and extending between the first manifold and a top side of the distributor plate;
    a bottom plate assembly;
    a pair of mold halves moveable between an open position in which the mold halves are spaced away from each other and a closed position in which the mold halves engage a portion of the bottom plate assembly and each other to form a mold;
    a pair of mold half support assemblies for respectively supporting the pair of mold halves and for selectively moving the mold halves between their open and closed positions;

a first plurality of vertical cooling passages located in the pair of mold halves, the first plurality of vertical cooling passages in the pair of mold halves being in fluid communication at bottom ends thereof with the plurality of apertures located in the distributor plate to be able to receive cooling air from the first manifold when the mold halves are in their closed position;

a second plurality of vertical cooling passages located in the pair of mold halves separate from the first plurality of vertical cooling passages located in the pair of mold halves, each of the second plurality of vertical cooling passages having an inlet and a single outlet, the outlet of each of the second plurality of vertical cooling passages being closer to the bottom ends of the first plurality of vertical cooling passages than the inlet of each of the second plurality of vertical cooling passages; and an additional manifold associated with each of the pair of mold half support assemblies, the additional manifolds being configured to connect to a second source of cooling air, the second plurality of vertical cooling passages in the pair of mold halves being in fluid communication at their respective inlets with at least one opening located in each of the additional manifolds to be able to continuously receive cooling air therefrom irrespective of the position of the mold halves.

2. An improved system as defined in claim 1, wherein the cooling air supplied to the first plurality of vertical cooling passages flows in an opposite direction from all of the cooling air supplied to the second plurality of vertical cooling passages.

3. An improved system as defined in claim 1, wherein the bottom plate assembly has a plurality of apertures extending therethrough, with the plurality of apertures extending through the bottom plate assembly being arranged and configured to be located intermediate the plurality of apertures located in the distributor plate and the first plurality of vertical cooling passages located in the pair of mold halves.

4. An improved system as defined in claim 1, wherein the first plurality of vertical cooling passages located in the pair of mold halves form an annular array characterized by a first diameter when the mold halves are in their closed position; and
   wherein second plurality of vertical cooling passages located in the pair of mold halves which form an annular array characterized by a second diameter larger than the first diameter when the mold halves are in their closed position.

5. An improved system as defined in claim 1, wherein the first plurality of vertical cooling passages extend completely through the each of the mold halves, from a bottom of each of the mold halves to a top of each of the mold halves.

6. An improved system as defined in claim 1, wherein the exits of the second plurality of vertical cooling passages are located on a side of each of the mold halves above a bottom of each of the mold halves.

7. An improved system as defined in claim 1, wherein at least a portion of the additional manifold associated with each of the pair of mold half support assemblies is integrally manufactured with the mold half support assembly it is associated with.

8. An improved system as defined in claim 1, wherein the first and second sources of cooling air are configured independently to facilitate them to be operated independently of each other.

9. An improved system as defined in claim 1, wherein each of the mold halves comprises:

an interior molding surface that defines a portion of the outer contours of a glass container;
an outwardly-extending ledge located below a top of the mold half; and
an inwardly-extending groove located in an outer surface of the mold half above a bottom of the mold half;
wherein the second plurality of vertical cooling passages each have an inlet at the outwardly-extending ledge and an outlet at the inwardly-extending groove.

10. An improved system as defined in claim 9, wherein the inwardly-extending groove has a flat surface on its top side and an angular surface on its bottom side, and is wider toward the outer surface of the mold half.

11. An improved system as defined in claim 1, wherein the bottom plate assembly comprises:
   a larger diameter portion connected by an intermediate portion above a base portion;
   and wherein the mold halves each comprise:
   a semi annular recess located just above a bottom of the mold half, the semi annular recesses in the mold halves receiving the larger diameter portion of the bottom plate assembly when the mold halves are closed;
   wherein the bottom plate assembly further comprises:
   a plurality of apertures extending through the base portion of the bottom plate assembly, the plurality of apertures being located in a circular configuration at a diameter larger than an outer diameter of the larger diameter portion of the bottom plate assembly.

12. An improved system as defined in claim 1, wherein there are between eight and thirty vertical cooling passages in the first array in each mold half; and
   wherein there are between five and twenty vertical cooling passages in the second array in each mold half.

13. An improved system for providing cooling air to molds for molding hot glass material into glass containers, comprising:

a first manifold located in configured to connect to a first source of cooling air, a first plurality of apertures located in a distributor plate on the top side of the first manifold and extending between the first manifold and a top side of the distributor plate;

a bottom plate assembly having a plurality of apertures extending therethrough;

a pair of mold halves moveable between an open position in which the mold halves are spaced away from each other and a closed position in which the mold halves engage a portion of the bottom plate assembly and each other to form a mold;

a pair of mold half support assemblies for respectively supporting the pair of mold halves and for selectively moving the mold halves between their open and closed positions;

a first plurality of vertical cooling passages located in and extending through the pair of mold halves which form an annular array characterized by a first diameter when the mold halves are in their closed position, the first plurality of vertical cooling passages in the pair of mold halves being in fluid communication at bottom ends thereof with the plurality of apertures in the bottom plate assembly and the plurality of apertures located in the distributor plate to receive cooling air from the first manifold when the mold halves are in their closed position, the cooling air flowing in a first direction in the first plurality of vertical cooling passages;

a second plurality of vertical cooling passages located in the pair of mold halves which form an annular array characterized by a second diameter larger than the first diameter when the mold halves are in their closed position, the second plurality of vertical cooling passages in the pair of mold halves being separate from the first plurality of vertical cooling passages located in the pair of mold halves, each of the second plurality of vertical cooling passages having an inlet and a single outlet, the outlet of each of the second plurality of vertical cooling passages being closer to the bottom ends of the first plurality of vertical cooling passages than the inlet of each of the second plurality of vertical cooling passages; and an additional manifold associated with each of the pair of mold half support assemblies, the additional manifolds being configured to connect to a second source of cooling air, the second plurality of vertical cooling passages in the pair of mold halves being in fluid communication at their respective inlets with at least one opening located in each of the additional manifolds to continuously receive cooling air therefrom irrespective of the position of the mold halves, all of the cooling air flowing in a second direction opposite to the first direction in the second plurality of vertical cooling passages.

14. An improved system for providing cooling air to molds for molding hot glass material into glass containers, comprising:

a first manifold having a distributor plate on a top side thereof in the bottom plate assembly for supplying cooling air from a first plurality of apertures extending between the first manifold and a top side of a distributor plate located on the top side of the first manifold;

a bottom plate assembly;

a pair of mold halves moveable between a spaced-apart open position and a closed position in which the mold halves and the bottom plate assembly form a mold;

a pair of mold half support assemblies for respectively supporting the pair of mold halves and selectively moving the mold halves between their open and closed positions;

a first plurality of vertical cooling passages located in the pair of mold halves that are in fluid communication at bottom ends thereof with the plurality of apertures in the bottom plate assembly to be able to receive cooling air from the first manifold when the mold halves are in their closed position;

a second plurality of vertical cooling passages located in the pair of mold halves each having an inlet and a single outlet the outlet of each of the second plurality of vertical cooling passages being closer to the bottom ends of the first plurality of vertical cooling passages than the inlet of each of the second plurality of vertical cooling passages; and an additional manifold associated with each of the pair of mold half support assemblies for allowing cooling air to be continuously supplied from at least one opening in each of the additional manifolds to the inlet of the second plurality of vertical cooling passages in the pair of mold halves irrespective of the position of the mold halves.

15. An improved system as defined in claim 14, wherein the cooling air supplied to the first plurality of vertical cooling passages flows in an opposite direction from the cooling air supplied to the second plurality of vertical cooling passages.

16. An improved system as defined in claim 14, wherein the first and second sources of cooling air are configured independently to facilitate them to be operated independently of each other.

17. A method for providing cooling air to mating mold halves for molding hot glass material into glass containers, comprising:

respectively supporting a pair of mold halves with a pair of mold half support assemblies which selectively move the mold halves between an open position in which the mold halves are spaced away from each other and a closed position in which the mold halves engage a portion of a bottom plate assembly and each other to form a mold;

providing a first plurality of vertical cooling passages in each of the mold halves;

providing a second plurality of vertical cooling passages in each of the mold halves separate from the first plurality of vertical cooling passages located in the pair of mold halves;

supplying cooling air from a first manifold having a distributor plate on a top side thereof through a first plurality of apertures located in the distributor plate to the first plurality of vertical cooling passages in the pair of mold halves at bottom ends thereof when the mold halves are in their closed position; and continuously supplying cooling air from an additional manifold associated with each of the pair of mold half support assemblies through at least one opening located in each of the additional manifolds to the second plurality of vertical cooling passages in the pair of mold halves at their respective inlets irrespective of the position of the mold halves, the cooling air exiting each of the second plurality of vertical cooling passages through a single outlet thereof, the outlet of each of the second plurality of vertical cooling passages being closer to the bottom ends of the first plurality of vertical cooling passages than the inlet of each of the second plurality of vertical cooling passages.

18. A method as defined in claim 17, additionally comprising:

supplying the cooling air to the first plurality of vertical cooling passages in a first direction such that all of the cooling air in the first plurality of vertical cooling passages flows in the first direction; and supplying the cooling air to the second plurality of vertical cooling passages in a second direction opposite to the first direction such that all of the cooling air in the second plurality of vertical cooling passages flows in the second direction.

19. A method as defined in claim 17, additionally comprising:

supplying cooling air to the first manifold from a first source; and supplying cooling air to the first manifold from a second source different from the first source.

20. A method as defined in claim 17, additionally comprising:

separately timing and controlling the cooling air flows supplied to the first and second manifolds.

* * * * *

UNITED STATES PATENT AND TRADEMARK OFFICE
CERTIFICATE OF CORRECTION

PATENT NO.       : 9,145,322 B2
APPLICATION NO.  : 13/723812
DATED            : September 29, 2015
INVENTOR(S)      : Pedro Pontes et al.

Page 1 of 1

It is certified that error appears in the above-identified patent and that said Letters Patent is hereby corrected as shown below:

In the claims,

Claim 14, Column 13, line 47 reads: "... outlet the outlet of each..."

This should read: "... outlet, the outlet of each..."

Signed and Sealed this
Fourteenth Day of June, 2016

Michelle K. Lee
*Director of the United States Patent and Trademark Office*